March 7, 1967  R. M. CASHMAN  3,307,399
SURFACE-PIERCING MAST FOR MEASURING THE DEPTH
OF A SUBMERGED VESSEL
Filed Oct. 12, 1964

INVENTOR
ROBERT M. CASHMAN
BY John J. Byrne
ATTORNEY

United States Patent Office 3,307,399
Patented Mar. 7, 1967

3,307,399
SURFACE-PIERCING MAST FOR MEASURING THE DEPTH OF A SUBMERGED VESSEL
Robert M. Cashman, Hingham, Mass., assignor to The Continental Oil Company, Ponca City, Okla., a corporation of Delaware
Filed Oct. 12, 1964, Ser. No. 403,162
1 Claim. (Cl. 73—311)

This invention broadly relates to means for determining the location and depth of a submerged vessel and more particularly relates to such means wherein waves or other surface disturbances are not reflected by the depth indicating means. In recent times it has been found very desirable to transport petroleum products and other materials by towed, submerged vessels as defined in the assignee's co-pending application S.N. 403,165 in the name of Harold E. Van der Linde, filed together herewith, and this invention is directed toward structure to be utilized with these towing systems.

An object of this invention is to provide a simple and sturdy construction which will indicate to those above the surface of the water, the location and depth of a towed submerged vessel.

An important objective of this invention is to provide a surface piercing mast extending upwardly from the submerged vessel an appreciable amount above the water surface and having an orifice communication with the water at its lower end, such that the level of water in the mast will gradually seek the level of the water surface.

Another important objective of the invention is to provide a surface piercing mast having visual indices on the exterior thereof whereby the depth and location of the submerged vessel can be determined visually if line-of-sight condition exist.

Another important objective of the invention is to provide a surface piercing mast of the type described wherein there are water level sensing means mounted to the interior of the mast for sensing the water level therein and transmitting this intelligence to a towing vessel by surface-to-surface radio.

A very important objective of this invention is to provide a surface piercing mast of a submersible vessel having a restricted orifice in the lower portion thereof opening the interior of the mast to the water but sufficiently restricting the flow so that surface disturbances such as waves are not immediately reflected on the interiorly mounted water level sensing means whereby a steady average depth of the submerged vessel is detected and transmitted.

A still further objective of the invention is to provide a surface piercing mast of the type described wherein the cross-sectional configuration thereof is formed to minimize the drag caused as it moves through the water.

These and other objectives and advantages of the invention will become more apparent upon a reading of the following description of one system made in accordance with the invention as diagrammatically illustrated by way of example in the drawings, in which.

Figure 4:
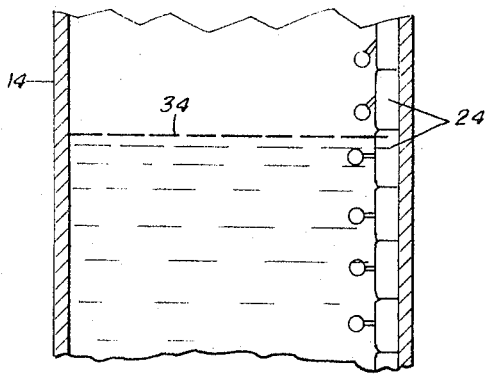

And FIGURE 4 is an enlarged interior view of the depth indicating mast.

Referring now more specifically to the drawings wherein like elements are indicated by like numerals, it should be understood that the drawings are very much out of scale but are accurate insofar as presenting the essentials of the invention described and claimed herein.

The numeral 10 indicates the hull of a submerged vessel adapted to be towed by a mother ship in the direction of arrow 12 by means of a towing cable not shown. Firmly secured to the upper portion of the hull is a mast 14 having a hollow rod or pipe 16 extending downwardly through the main body of the barge.

At its lower end 18, pipe 16 is in communication with the body of water 20 and provides a restricted orifice to the interior of mast 14. Neither the rod 16 nor the mast 14 are in communication with the interior of the hull 10 although they are of course in fluid communication with each other.

Indicia marks 22 are painted or otherwise secured to the exterior of mast and have numerals (not shown) adjacent the marks indicating the distance from the submerged vessel. When visual conditions permit, personnel at the towing ship may readily locate the bearing of the submerged vessel and may determine its depth merely by reading the indicia marks at water surface level.

In many conditions of sea and weather, it is impossible to make these visual determinations. Therefore means are provided interiorly of the mast to provide remote measurements. A plurality of float actuated sensors 24 are mounted longitudinally of the interior of mast 14. The sensors are of known design and are individually connected electrically to the mast antenna 28. A battery power supply 29 is mounted within the mast for the electrical requirements of the switches and the transmitting equipment associated with antenna 28.

The particular float actuators to be used and the manner in which the actuator is connected to the radio for transmission of the intelligence gained therefrom do not form a part of this invention. Such arrangements (making electrical measurements for radio transmission) are well known to those skilled in the radio arts.

The upper end of mast 14 is closed by top cover 30. Immediately below the cover 30, the mast is formed with a plurality of vent openings. The top cover provides protection from the elements and for the electrical equipment within the mast, and the vent openings provide an outlet for air displaced by water entering via rod 16.

Figure 1:
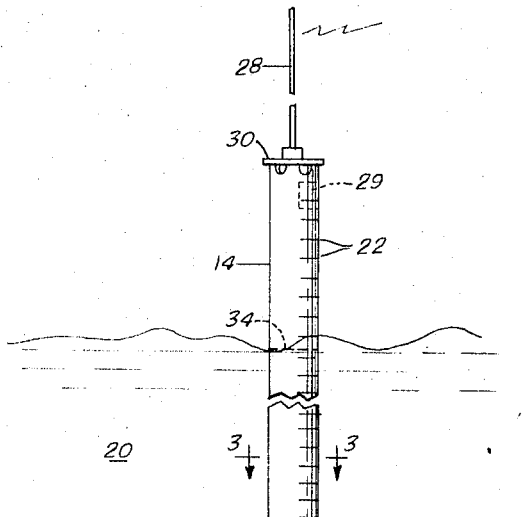
FIGURE 1 is a partial elevation view showing the submerged vessel and its mast.
Figure 2:
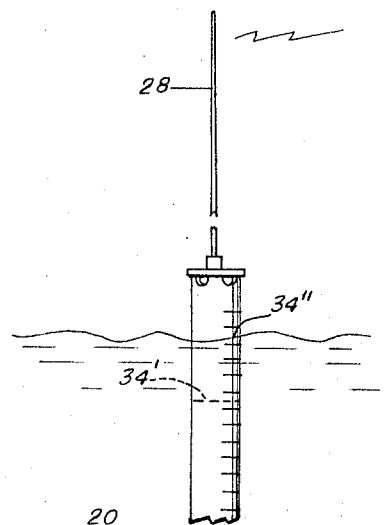
FIGURE 2 is a view similar to FIGURE 1 with the submerged vessel at a greater depth.

In heavy seas the height and frequency of waves present a serious problem to electrical sensing devices. The temporary nature of the waves, of course, does not indicate the true depth of the submerged vessel. The tubular rod 16 provides a restricting orifice which delays the entry of water into the mast so that the water level 34 (within the tube) will not vary an appreciable amount due to changes in level caused by random and temporary surface disturbances. As shown in FIGURE 2, if the submerged vessel actually does decrease its depth below the surface of the water, the water level will gradually rise from the position indicated as 34' to that indicated by the numeral 34".

Figure 3:
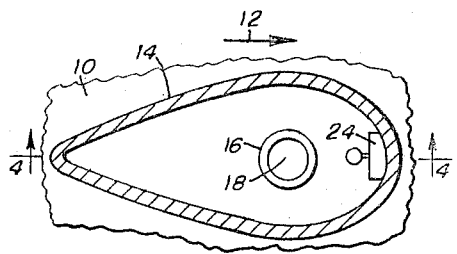
FIGURE 3 is an enlarged cross-sectional along the line 3—3 of FIGURE 1.

Referring to FIGURE 3 the shape of mast 14 is preferably a tear-drop to less the skin friction between mast and water as the submerged vessel travels therethrough.

It can be seen that there has been described a method and structure for locating and determining the depth of a submerged vessel in a relatively inexpensive, simple and efficient manner. The invention provides a visual confirmation of approximate depth, its approximate range and bearing at all times except when line-of-sight visibility is restricted. Under such conditions, range and bearing can still be maintained by radar contact while relying on the switching mechanisms 24 to indicate vessel depth. It will be understood that the portion of the mast projecting above the water surface may be used to support running lights, radar reflectors and other transmitter and receiver units which are advantageously used during a submerged towing operation.

In a general manner, while I have, in the above description, disclosed what I deem to be a practical and efficient embodiment of my invention, it should be well understood that I do not wish to be limited thereto, as there might be changes made in the arrangement, disposition, and form of the parts without departing from the principle of the present invention as comprehended within the scope of the accompanying claim.

I claim:

A device for determining the depth of a vessel submerged in water comprising a hollow, tear-shaped tube extending upwardly from said vessel and projecting a substantial distance above the medium's upper surface, a second tube extending from the lower end of said first tube and forming a restricting entry conduit communicating the interior of said tube to the water, a plurality of electrical sensing means mounted longitudinally of the interior of said tube to determine the location of the level of the water within said tube, each of said sensing means comprising a float projecting into said tear-shaped tube and movable in a vertical plane, whereby water in said tube activates progressively higher floats as it moves upwardly therein, radio-transmission means connected to said sensing means whereby the depth of said vessel below said upper surface is determined without being affected by temporary disturbances in said upper surface and can be transmitted in a steady signal.

References Cited by the Examiner

UNITED STATES PATENTS

| | | | |
|---|---|---|---|
| 1,227,285 | 5/1917 | Maher | 73—299 X |
| 1,478,288 | 12/1923 | MacGregor | 73—300 |
| 1,617,287 | 2/1927 | Huggins | 73—313 X |
| 2,299,077 | 10/1942 | Cole et al. | 73—299 |
| 2,516,452 | 7/1950 | Degiers et al. | 73—311 |
| 2,839,920 | 6/1958 | MacAnespie | 73—300 X |

FOREIGN PATENTS 11,481   9/1893   Great Britain.

LOUIS R. PRINCE, *Primary Examiner.*

DAVID SCHONBERG, *Examiner.*

F. H. THOMSON, S. C. SWISHER, *Assistant Examiners.*